Oct. 17, 1944.     W. G. BOND ET AL     2,360,545
HIDE PLANIMETER
Filed Aug. 10, 1943      4 Sheets-Sheet 1

Inventors:
William G. Bond
Alexander Setters
by their Attorneys
Howson & Howson

Oct. 17, 1944. W. G. BOND ET AL 2,360,545
HIDE PLANIMETER
Filed Aug. 10, 1943 4 Sheets-Sheet 2

Inventors:
William G. Bond
Alexander Sellers Jr.
by their Attorneys
Howson & Howson

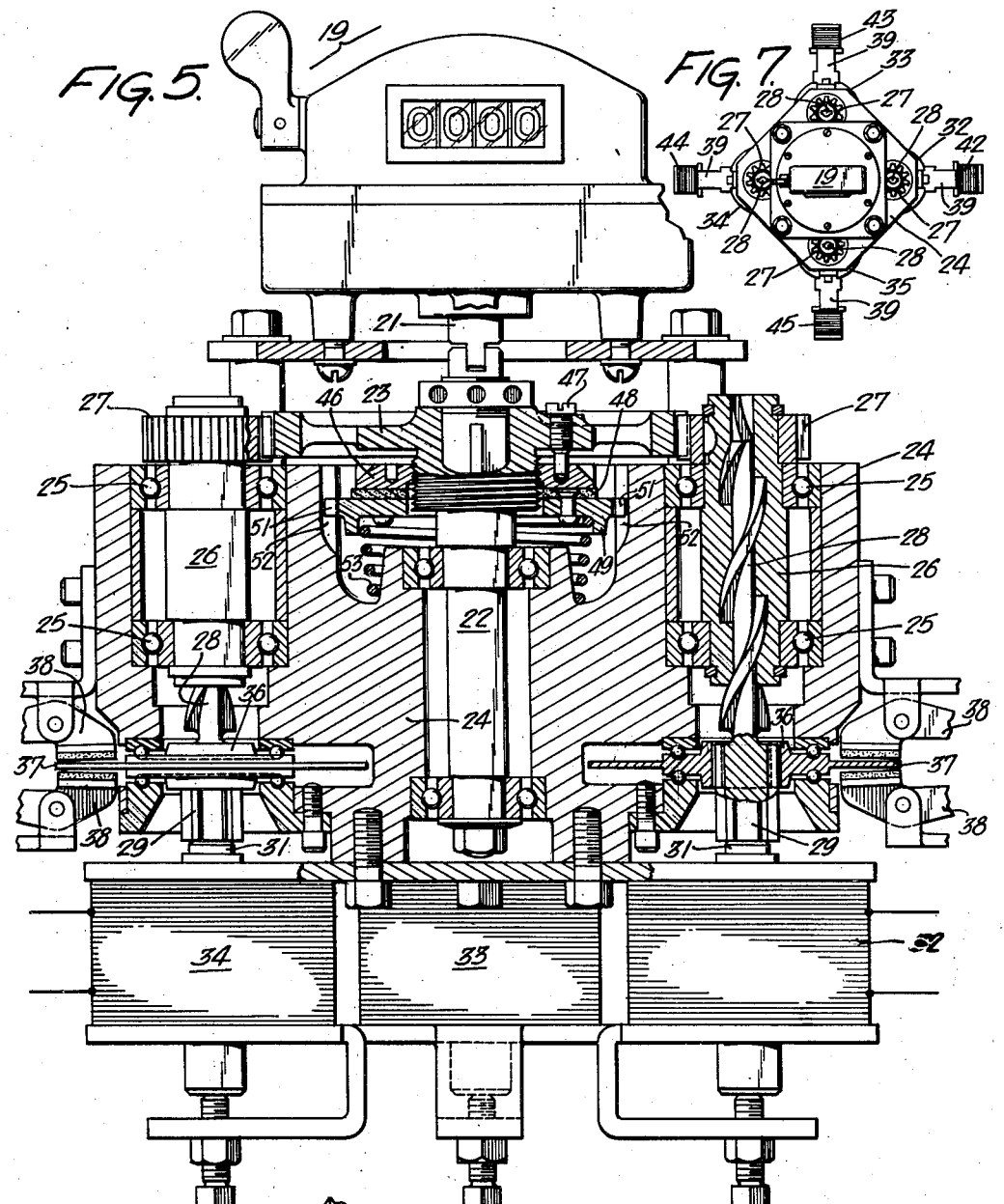
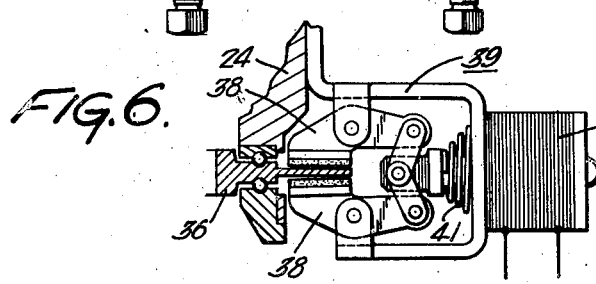

Oct. 17, 1944. W. G. BOND ET AL 2,360,545
HIDE PLANIMETER
Filed Aug. 10, 1943 4 Sheets-Sheet 4
FIG. 8.
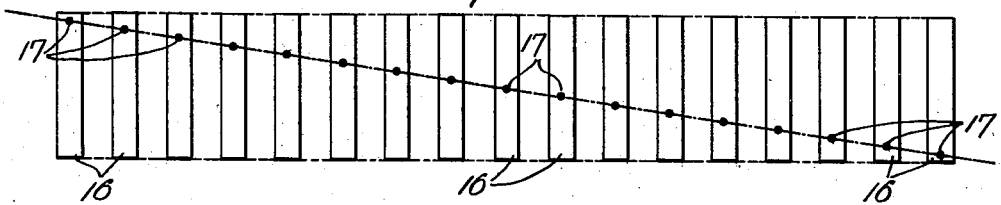
FIG. 9.
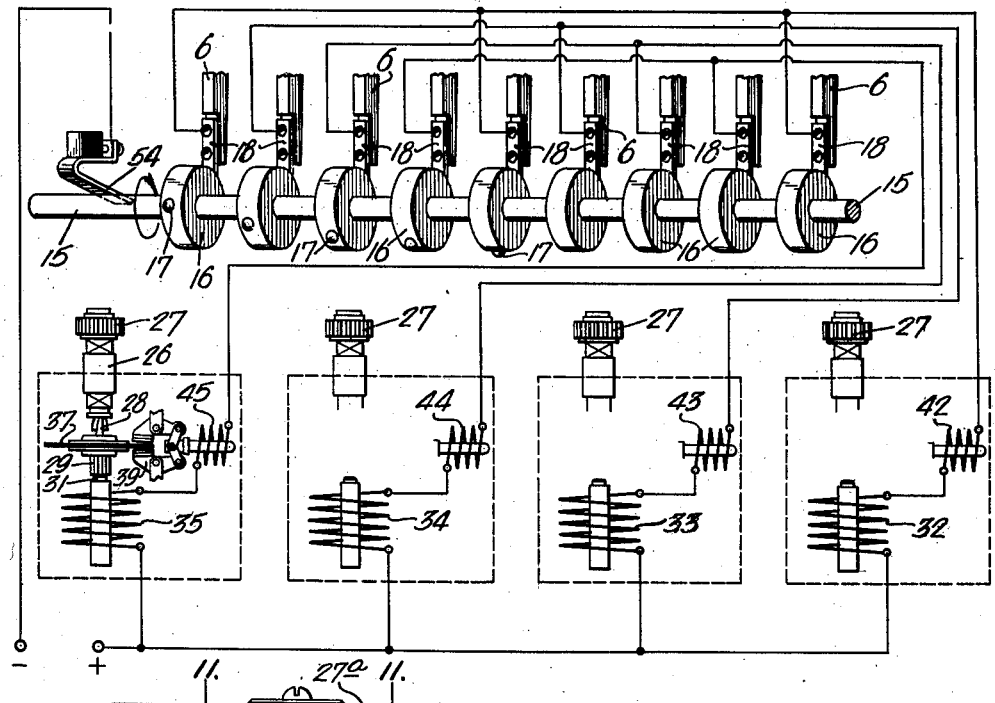
FIG. 10 FIG. 11
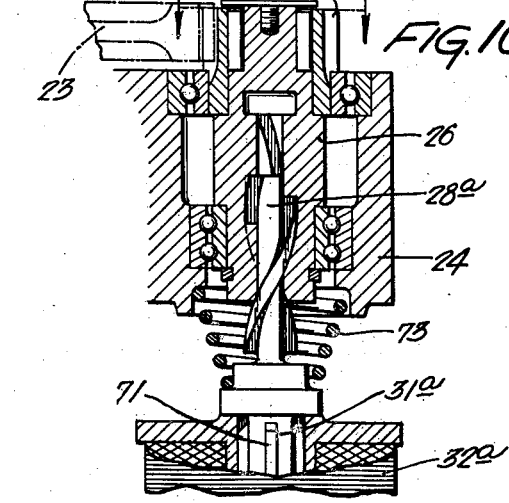 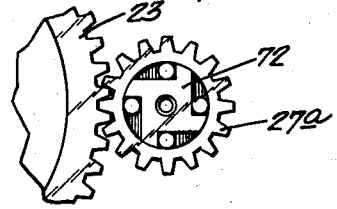
Inventors:
William G. Bond
Alexander Sellers Jr.
by their Attorneys
Howson & Howson Patented Oct. 17, 1944

2,360,545

UNITED STATES PATENT OFFICE 2,360,545

HIDE PLANIMETER

William G. Bond, Holly Oak, and Alexander Sellers, Jr., Bellevue, Del., assignors to F. F. Slocomb Corporation, Wilmington, Del., a corporation of Delaware Application August 10, 1943, Serial No. 498,128

15 Claims. (Cl. 33—123)

This invention relates to planimeters, more particularly for measurement of hides and the like, and the principal object of the invention is to provide a planimeter which will operate more rapidly and with a greater degree of precision than the machines of the prior art.

The invention resides also in certain mechanical details and combinations hereinafter described and illustrated in the attached drawings in which, Fig. 1 is a fragmentary sectional view of a portion of a planimeter made in accordance with the invention;

Fig. 5 is a vertical sectional view showing the counter device and the immediately associated elements of the counter-actuating mechanism;

Fig. 6 is a fragmentary view illustrating the detail of the counter-actuating mechanism;

Fig. 7 is a reduced plan view of the portion of the mechanism shown in Fig. 5;

Fig. 8 is a diagrammatic view showing the development of the several contacter wheels in the relative positions which they normally occupy in the assembly;

Fig. 9 is a view in perspective of the contacter assembly together with a diagram of the associated electrical system;

Fig. 10 is a fragmentary sectional view illustrating a modification within the scope of the invention;

Fig. 11 is a section on the line 11—11, Fig. 10, and

Figure 1:
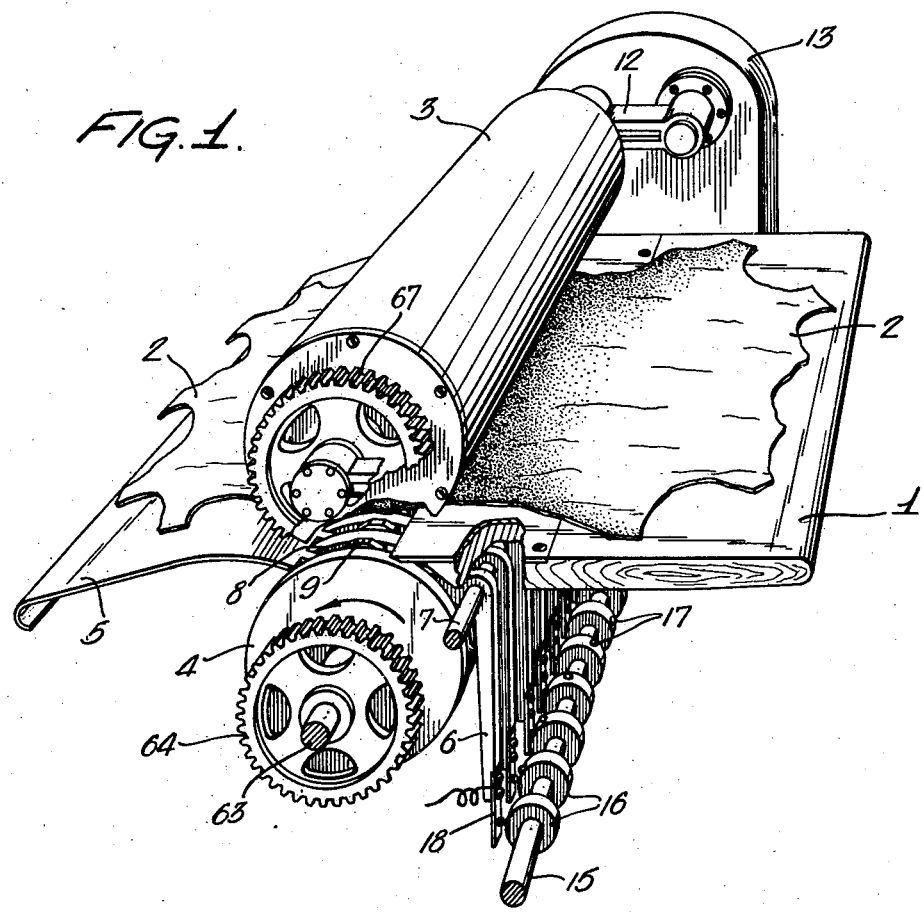
Figure 2:
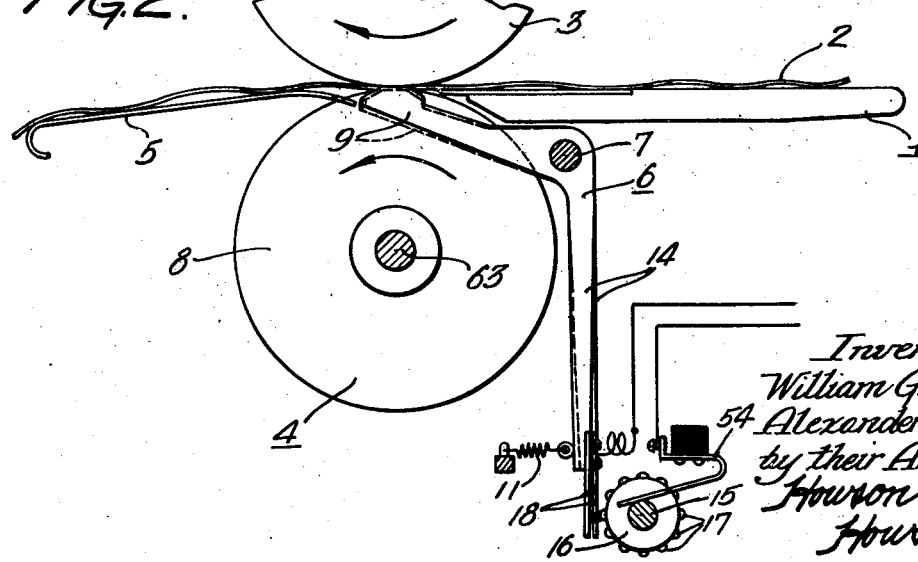
Fig. 2 is a side elevational view of the mechanism shown in Fig. 1.
Figure 3:
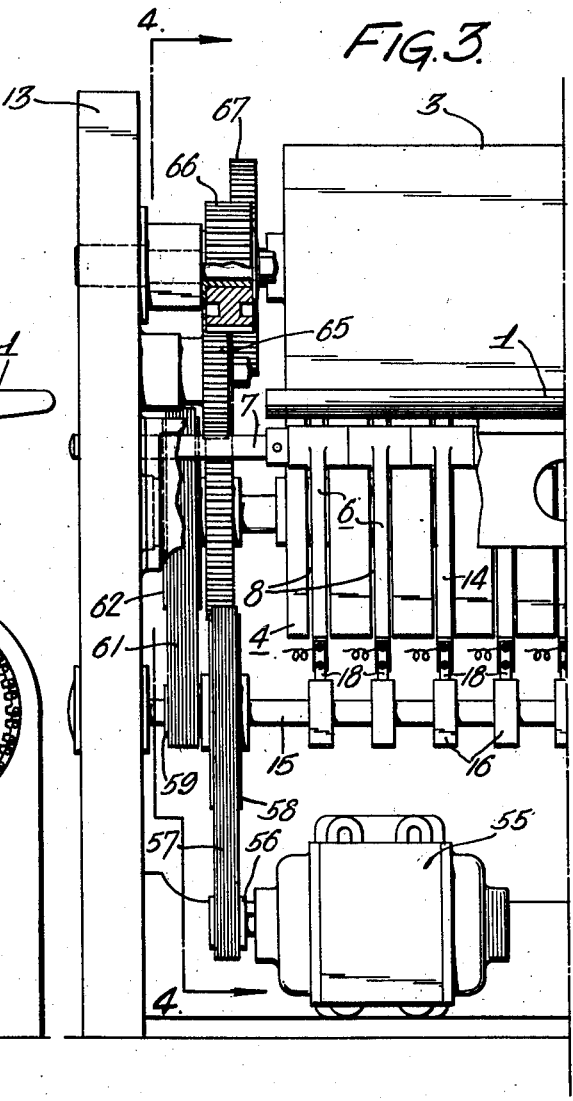
Fig. 3 is an elevational view of the planimeter machine showing the power source and transmission elements.

With reference to the drawings, the planimeter in a preferred embodiment may comprise a table 1 over which the hides are fed between rollers 3 and 4, one of said hides being indicated at 2. Table 1 comprises an extension 5 which, as best shown in Fig. 2, is spaced from the rear end of the table 1 so as to provide a gap for the roll 4 and for a plurality of traverse members 6 pivotally mounted on a cross bar 7. The cylinder 4 has a series of circumferential recesses 8, as shown in Figs. 1, 2 and 3, and these recesses receive the upper transverse arm 9 of the respective traverse members 6. The members 6, under action of springs 11, normally assume a position as shown in full lines in Fig. 2, the outer end of the arm projecting slightly above the upper surface of the table 1—5 and beyond the periphery of the roll 4. The roll 4 itself extends at the top slightly above the surface of the table 1—5, and the roll 3 rests upon the top of the roll 4. As shown in Fig. 1, the roll 3 is journaled on arms 12 which are pivotally secured in the fixed side members 13 of the machine frame so that the full weight of the roll 3 falls upon the roll 4. These two rolls, 3 and 4, constitute feed rolls for advancing the hides over the table and for that purpose are driven by mechanism hereinafter described. It will be apparent that the hide, in passing between the rolls 3 and 4, will engage the projecting ends of the arms 9 and will depress the arms so that the associated traverse member 6 will be forced to assume a position indicated in broken lines in Fig. 2.

It will be noted that the traverse members 6 are arranged in series extending across one dimension of the hide surface as it passes through the machine and that the movement of the hide over the table is in the direction of another of said dimensions. In the present instance, the series of traverse members is sufficiently extended to embrace the entire transverse dimension of the hide so that the measurement of the surface area is obtainable by a single pass of the hide through the machine.

Opposite the lower ends of the depending arms 14 of the members 6, is a shaft 15 and this shaft carries a plurality of disks 16 each of which carries an electrical contact point 17. The disks 16 are arranged respectively in line with the arms 14 of the respective traverse members 6. Each of the arms 14 carries a contact element 18 which, when and only when the members 6 have assumed the positions shown in dotted lines in Fig. 2 will occupy positions in the paths of the projecting contact elements 17 of the disks so that rotation of the shaft 15 and of the disks will result, in each case, in a periodic contacting of the elements 17 and 18. It will be noted, by reference to Fig. 8, that the elements 17 are relatively arranged on the respective disks so that no two of the elements 17 will engage the associated contact element 18 at the same time and so that the said contacts may be successively and in regular cycle although not necessarily in the same sequence.

With reference to Figs. 5, 6 and 7, the mechanism further comprises a counter 19 which may be of conventional design, and operating shaft 21 of this counting device is coupled to a vertical shaft 22 which carries, at its upper end, a toothed gear 23. The shaft 22 is journaled on antifriction bearings in a housing 24, and also journaled in this housing upon antifriction bearings 25, is a plurality of vertical shafts 26, each of which carries at its upper end, a pinion 27 which meshes with the gear 23. As indicated in Fig. 7, the shafts with their pinions 27 are four in number and are separated from each other around the shaft 22 at angles of 90 degrees.

As shown at the right of Fig. 5, each of the shafts 26 is provided with a central screw-threaded bore formed for cooperative reception of a screw 28, this screw having a splined base 29 which rests upon the upper end of a plunger 31 of a solenoid, the respective solenoids being identified by the reference numerals 32, 33, 34 and 35. The splined base 29 is engaged in the hub 36 of a disk 37, the said hub being formed to receive the splines and the disk being thereby held against rotation with respect to the plunger 28. Each of the disks 37 is supported for rotation on bearings, as illustrated, and is arranged for engagement by jaws 38 of a toggle clutch 39, as shown best in Fig. 6. Clutch 39 is normally retained in a released position, as shown, by a spring 41 and is actuated against the spring to clamp the disk 37 by means of a solenoid, the respective solenoids being indicated by the reference numerals 42, 43, 44 and 45.

It will be apparent that if the clutch 39 is engaged with the disk 37 so as to hold the disk stationary when the plunger 31 of the associated solenoid is elevated, the screw 28 will be prevented, by the splined connection between the base 29 and the hub 36 of the disk, from rotating. The upward axial movement of the screw 28, under these conditions, will cause the associated shaft 26 to turn about its axis and will thereby, through the pinion 27, gear 23 and shaft 22, transmit an actuating impulse to the counter 19. If, on the other hand, the axial movement of the screw 28 occurs when the disk 37 is free from the associated clutch 39, the screw will be free to turn on its own axis, and will, therefore, have no effect on the shaft 26 which will remain stationary.

It will be noted that the shaft 22 is provided with a flat-faced nut 46, which is held against rotation by a set screw 47 and which is adapted for facial contact with a friction facing 48 on a member 49, this latter member having radially projecting fingers 51 which project into slots 52 in the casing 24 so as to prevent the member 49 from turning about the axis of the shaft. A spring 53 exerts resilient pressure upon the member 49 tending to retain this member with its facing 48 in frictional engagement with the flat under-surface of the nut 46. The frictional pressure may be regulated by adjustment of the nut 46 on the shaft. This device provides a frictional drag which tends to resist rotation of the shaft 22 and prevents over-running of the shaft when actuated by the pinions 27 of the shafts 26.

Referring more particularly to Fig. 9, it will be noted that the solenoids 32—33—34—35 and also the solenoids 42—43—44—45 are connected in an electrical system which includes a source of energy (not shown) and the series of contact elements 17 and 18. In the present instance, the circuit is shown as including a contact element 54 which makes contact with the shaft 15 and through the shaft with the several contact elements 17 on the disks 16. When the shaft 15 is rotated, a circuit is completed periodically through each of the contact elements 18. Thus the element 18 at the extreme left of the series, as viewed in Fig. 9, is connected directly with the solenoids 42 and 32 which are arranged in series in the circuit. The immediately adjoining element 18 is similarly connected in a parallel circuit with the solenoids 43 and 33; and the succeeding two elements 18 are connected respectively in parallel circuits which include the solenoids 44—34 and 45—35 respectively. The fifth element 18 of the series is connected with the solenoids 42—32 in the same manner as and in parallel with the first element 18 of the series; the sixth, seventh and eighth elements being similarly connected respectively with the sets of solenoids 43—33, 44—34, 45—35, and the final element of the series with solenoids 42—32.

It has been pointed out previously that the elements 17 are so relatively arranged angularly with respect to the axis of the shaft 15 that they come into position to complete the respective circuits in succession, this position being attained only once by each of the elements in each full revolution of the shaft 15. The circuit is arranged also so that the four said sets of solenoids are energizable successively in regular cycle, but since the energizations depend upon the traverse members 6 being in contact with the work, the actuations of the solenoids in actual practice are not necessarily in regular sequence. With the particular arrangement shown, and assuming that all of the traverse members 6 are in the retracted position wherein the contact element 18 lies in the path of the associated element 17, the solenoids 42—32 will be energized three times, and each of the other sets of solenoids two times, in each complete rotation of the shaft 15. Furthermore, between each successive energization of any one of the sets of solenoids there is necessarily a lag corresponding to the angular offset about the shaft 16 between the two elements 17 which by contact with the associated elements 18 were responsible for said energizations. By thus employing a plurality of counter-actuating motors, in the form in the present instance of the several solenoids, and by apportioning the impulse originating in the members 6 and transmitted to the motors through the elements 17 and 18 so that there is a substantial lapse of time between successive actuations of each motor, it is possible to effect an extremely rapid, and in fact almost continuous, actuation of the counter by repetitive impulses originating from a relatively large number of separate sources. These sources in the present instance and as set forth above are the members 6, and while any of these contacts is in engagement with the hide there is a rapid succession of impulses from that particular source each of which is marked on the counter in terms of a small component part of the total hide area. The machine may thus measure and record in terms of relatively small areas, which makes for relatively great precision; and the measurements can be made also at relatively high speed.

Figure 4:
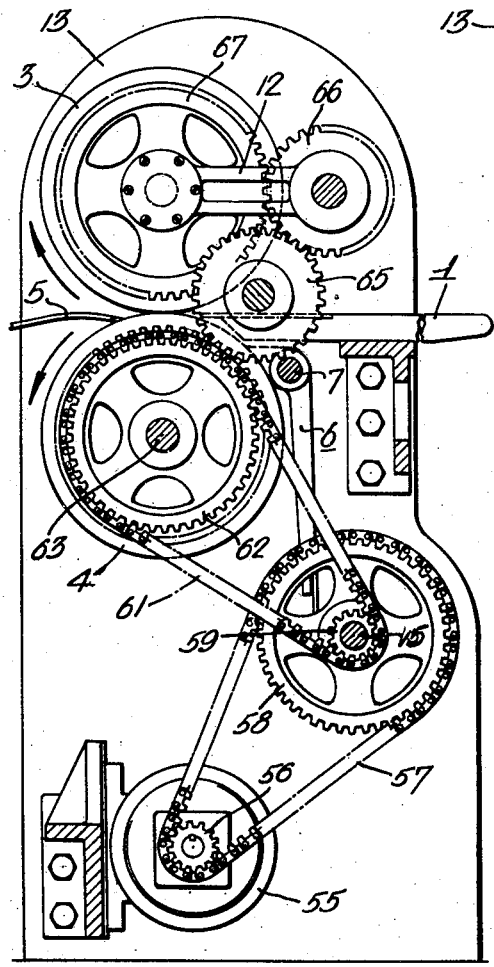
Fig. 4 is a section on the line 4—4, Fig. 3.

With reference to Figs. 3 and 4, the prime mover of the machine takes the form of an electric motor 55. A pinion 56 on the motor shaft is connected through a chain belt 61 with a gear 62 on the shaft 63 of the roll 4, and this shaft also carries a gear 64 which, through idlers 65 and 66, are connected with a gear 67 on the one of the trunnions of the roll 3. The feed rolls 3 and 4 are thus positively synchronized with the shaft 15.

There may be modification of the mechanism without departure from the invention. Thus in Figs. 10 and 11, we have illustrated a modified form of the motor means which actuates the indicating mechanism. In this case, the screw 28A is formed integrally with the plunger 31A of the solenoid 32A and the plunger 31A is splined to the solenoid as indicated at 71 so as to prevent rotation of the screw. Reciprocation of the screw 28A will thereby cause an oscillation of the vertical shaft 26, or in other words, the shaft will be rotated for each directional movement of the screw. The pinion 27A is, in this case, not fixed to the shaft 26 but is connected to the shaft through the medium of a one way clutch 72 which is illustrated in detail in the sectional view of Fig. 11. This clutch operates to clamp the pinion to the shaft when the rotation of the shaft is in one direction and to release the pinion from the shaft when the direction of shaft rotation is reversed. In this case also, a spring 73 exerts resilient pressure tending to hold the solenoid plunger 31A in a depressed or retracted position. As in the embodiment of the invention previously described, the reciprocation of the solenoid plunger 31A is converted into intermittent rotation in a single direction of the pinion 27A.

Figure 12:
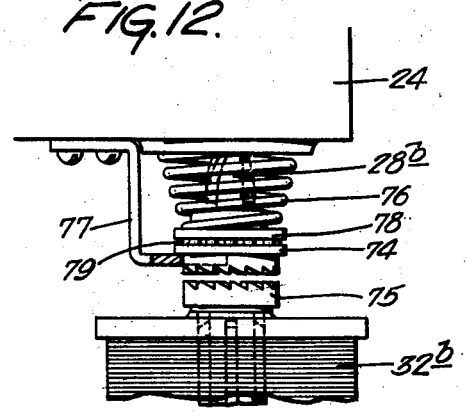
Fig. 12 is a fragmentary view illustrating still another modification.

Still another modification of the motor means is illustrated in Fig. 12. In this case, the screw 28B is provided with a base 74, and the solenoid plunger is provided at its upper end with a member 75 which, when the plunger is elevated, engages the base member 74 and interlocks with the latter through the medium of ratchet teeth formed on the meeting faces, as illustrated. These ratchet teeth will permit rotation of the base member 74 with respect to the member 75 in one direction only. The screw 28B with its base, is, in this case, supported in a depressed position against the pressure of a spring 76 by a bracket 77. This bracket does not interfere with the elevation of the screw 28B and its base 74 when the solenoid plunger is elevated. When the solenoid plunger is elevated and engages and lifts the screw 28B, the latter is prevented from turning during the upstroke by the intermeshing ratchet teeth described above so that the vertical shaft (not shown), associated with the screw 28B, is rotated. On the downward stroke of the solenoid plunger, ratchet teeth permit the screw 28B to rotate with respect to the associated vertical shaft so that the shaft remains stationary. It will be noted that the lower end of the spring 76 seats upon a loose collar 78 which is supported on antifriction bearings upon the base member 74, this base member being rigidly secured to the screw 28B.

We claim:

1. In a planimeter, a series of work traverse members, and means for relatively moving said work and members, a counting mechanism, a plurality of operating motors for said mechanism, means associated with each of said traverse members and operative only when the said member is in contact with the work for periodically actuating one or another of said motors, and means for timing the said actuating means so that the actuations may occur one at a time, and with at least a predetermined minimum lapse between successive actuations of any one of the motors.

2. In a planimeter, a series of work traverse members and means for relatively moving said work and members, a counting mechanism, a plurality of electric motors for operating said mechanism, a motor control switch operatively associated with each of said traverse members, said switch including an element normally retracted and inoperative, means for advancing said element to an operative position only when the traverse member is in contact with the work, means for periodically closing the switch when the said element is in the advanced position, thereby intermittently energize one or another of said motors, means for timing the said closing means so that the switches are closed in succession, and means for connecting the switches to the motors so as to afford at least a predetermined minimum lapse between successive energizations of any one of the motors.

3. In a planimeter, a counting mechanism, a plurality of operating motors for said mechanism, a plurality of work-traverse members operatively connected to each of said motors, means associated with each of said members and operative only when the member is in contact with the work for periodically actuating the related motor, and means for timing the operations of all of said periodic actuating means so that the actuations of the motors may occur separately and with at least a predetermined minimum lapse of time between successive actuations of any one of the motors.

4. In a planimeter, a series of work traverse members and means for relatively moving said work and members, a counting mechanism, a plurality of electric motors for operating said mechanism, a motor control switch operatively associated with each of said traverse members, said switch including an element normally retracted and inoperative, means for advancing said element to an operative position only when the traverse member is in contact with the work, means for periodically closing the switch when the said element is in the advanced position, thereby intermittently energize one or another of said motors, a source of electric energy, a plurality of parallel circuits connected with said course and each containing one of said motors and, in parallel with each other, a separate selected number of said switches, and means for timing the said switch-closing means so that the switches are closed in succession and so that the motors are energized one at a time and with at least a predetermined minimum lapse between successive energizations of any one of the motors.

5. In a planimeter, a series of work traverse members, and means for relatively moving said work members, a counting mechanism, a plurality of electric motors individually operatively connected to said mechanism, a motor control switch associated with each of the traverse members and operative intermittently only when the said member is in contact with the work, a plurality of parallel electric circuits each containing one of the motors and, in parallel with each other, a separate selected number of said switches, and means for timing the said intermittent operations of the switches.

6. In a planimeter, a series of work traverse members, and means for relatively moving said work and members, a counting mechanism, a plurality of operating motors for said mechanism, intermittent motor-actuating means associated with each of said traverse members and operative only when the member is in contact with the work, means for operatively connecting each of the motors with a separate selected number of said actuating means, and means for timing the intermittent operations of the actuating means.

7. In a planimeter, a series of work-traverse members and means for relatively moving said work and members, an electric switch associated with each of the members, said switch comprising an element operatively connected to the member and a companion element movable in a cyclic path for intermittent contact with the element first named, each of the said first named elements being normally in a retracted and inoperative position with respect to the companion element and being advanced into the cyclic path of the latter element when the related traverse member is in contact with the work, means for actuating the elements of the second named group in synchronism with the relative movement of the traverse members and the work, means for timing the intermittent actuations of the switches so that they occur individually and one at a time, and indicating mechanism operatively associated with the switches.

8. In a planimeter, a series of work-traverse members and means for relatively moving said work and members, an electric switch associated with each of the members, said switch comprising an element operatively connected to the member, a rotary companion element arranged for intermittent contact with first named element, a common rotary carrier for the elements of the second group, means for normally retaining the elements of the first named group in a retracted position with respect to the rotary elements and for advancing them into the paths of the rotary elements only when the respective traverse members are in contact with the work, means for relatively angularly separating the sets of contact element around the axis of the carrier so that the actuations of the switches occur individually and one at a time, and indicating mechanism operatively associated with the switches.

9. In a planimeter, a table and means for feeding a work piece over the table, a series of traverse members normally positioned in the path of the work and adapted to be displaced from the said normal position by contact with the work surface, an electric switch associated with each of said members and each comprising an element carried by the member and a companion rotary element for intermittent engagement with the element first named, the elements of the first named group being normally retracted from the respective rotary elements and being advanced into the paths of the latter elements only when the traverse members are displaced by the work, a common shaft for the rotary elements, and means for rotating the shaft in synchronism with the feeding of the work piece, said rotary elements being angularly separated around the axis of the shaft so as to afford individual one-at-a-time actuations of the switches.

10. In a planimeter, a series of work-traverse members and means for relatively moving said work and members, an indicator, and mechanism including a motor for operatively connecting the members with the indicator, said motor consisting of a rotary element attached to the indicator, an axially reciprocatory element, means for interconnecting said elements so that reciprocation of the one tends to rotate the other, means for reciprocating the one said element, and means operative in one direction only of said reciprocatory movement for preventing rotation of the reciprocatory element.

11. In a planimeter, a series of work-traverse members and means for relatively moving said work and members, an indicator, and mechanism including a motor for operatively connecting the members with the indicator, said motor consisting of a pair of relatively movable rotary elements, and means for interconnecting said elements so that relative reciprocation thereof while one is held against rotation tends to effect rotation of the other, means for relatively reciprocating said elements, and means operative in one direction only of said relative reciprocation for preventing rotation of the said one element.

12. In a planimeter, a series of work-traverse members and means for relatively moving said work and members, an indicator, and mechanism including a motor for operatively connecting the members with the indicator, said motor consisting of a solenoid, an element mounted for reciprocation by the solenoid and rotatable about the axis of said reciprocatory movement, means for holding said element against rotation while moving in one direction of said reciprocatory movement and for releasing the element for rotation while moving in the other direction, and a rotary element interconnected with said reciprocatory element so that the relative reciprocation of the elements may cause an intermittent rotation of second named element.

13. In a planimeter, a series of work-traverse members, and means for relatively moving said work and members, an indicator and mechanism including a motor for operatively connecting the members with the indicator, said motor comprising a solenoid, an element mounted for reciprocation by the solenoid and rotatable about the axis of said reciprocatory movement, a rotary element having a splined connection with said reciprocatory element, a clutch operative when engaged to hold said rotary element against rotation, electrical means arranged in series with said solenoid for engaging the clutch, means for disengaging the clutch when said electrical means is de-energized, and a rotary element interconnected with said reciprocatory element so that the relative reciprocation of the elements may cause an intermittent rotation of the second named element.

14. In a planimeter, a series of work-traverse members, and means for relatively moving said work and members, an indicator and mechanism for operatively connecting the members with the indicator, said mechanism including a shaft coupled to said indicator, means for frictionally resisting rotation of said shaft and a motor for rotating the shaft against said frictional resistance, said motor consisting of a rotary element connected operatively to the shaft and an axially reciprocatory element, means for interconnecting said elements so that reciprocation of the one tends to rotate the other, means for reciprocating the one said element, and means operative in one direction only of said reciprocatory movement for preventing rotation of the reciprocatory element.

15. In a planimeter, a series of work-traverse members, and means for relatively moving said work and members, an indicator and mechanism for operatively connecting the members with the indicator, said mechanism including a rotary member connected with the indicator, a reciprocatory driven member, and means for converting the reciprocation of the one member into a unidirectional intermittent rotation of the other member.

WILLIAM G. BOND.
ALEXANDER SELLERS, Jr.